(12) United States Patent
Bucks et al.

(10) Patent No.: US 6,430,065 B2
(45) Date of Patent: *Aug. 6, 2002

(54) POWER CIRCUIT FOR A SEMICONDUCTOR LIGHT SOURCE OPERABLE FROM A SOLID STATE RELAY

(75) Inventors: Marcel J. M. Bucks; Engbert B. G. Nijhof, both of Best; Johannes E. Algra, Oss, all of (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/522,717

(22) Filed: Mar. 10, 2000

(30) Foreign Application Priority Data

Mar. 12, 1999 (EP) .............................. 99200751

(51) Int. Cl.⁷ .......................... H02J 3/00; H05B 37/02
(52) U.S. Cl. ............................ 363/34; 315/225
(58) Field of Search .................. 363/34, 89, 84, 363/20, 21; 323/222; 315/219, 224, 239, 225

(56) References Cited

U.S. PATENT DOCUMENTS

| 4,595,814 A | * | 6/1986 | Ogino et al. ............. 219/10.77 |
| 4,940,929 A | * | 7/1990 | Williams ..................... 323/222 |
| 5,134,344 A | * | 7/1992 | Vos et al. .................... 315/239 |
| 5,404,092 A | * | 4/1995 | Gegner ........................ 323/207 |
| 5,661,645 A | * | 8/1997 | Hochstein ..................... 363/89 |
| 5,715,154 A | * | 2/1998 | Rault ............................ 363/89 |
| 6,000,042 A | * | 12/1999 | Henrie .......................... 714/40 |

FOREIGN PATENT DOCUMENTS

| EP | 0660648 A1 | 6/1995 | ........... H05B/33/08 |
| WO | WO9907059 | 2/1999 | ........... H02M/3/335 |
| WO | WO9907187 | 2/1999 | ........... H05B/33/08 |
| WO | WO9907188 | 2/1999 | ........... H05B/33/08 |

* cited by examiner

Primary Examiner—Rajnikant B. Patel

(57) ABSTRACT

A circuit for receiving electrical power from a switched source such as a solid state relay, and providing power to a semiconductor light source. A rectifier circuit and an interference filter are connected in series between input connections which are connected to the switched source, and a converter which provides the required voltage and current combination for the light source. To prevent improper operation of the switched source, such as oscillation, the portion of the circuit between the input terminals and the rectifier circuit is free from capacitive elements. Preferably the interference filter is connected between the rectifier and the converter. The light source may be used as a signal light, and the circuit may be incorporated in the housing of the signal light.

10 Claims, 1 Drawing Sheet

POWER CIRCUIT FOR A SEMICONDUCTOR LIGHT SOURCE OPERABLE FROM A SOLID STATE RELAY

BACKGROUND OF THE INVENTION

The invention relates to a circuit arrangement for operating a semiconductor light source, comprising
connection terminals for connecting a power supply,
input filter means,
rectifier means,
a converter with a control circuit, and
output terminals for connecting the semiconductor light source.

The invention also relates to a signal light provided with such a circuit arrangement.

A circuit arrangement of the type mentioned in the opening paragraph is described in U.S. Pat. No. 5,661,645. Semiconductor light sources are being increasingly used as signal lights. In such an application, the advantages of a semiconductor light source over a customary incandescent lamp are a substantial improvement in service life and a substantial reduction in power consumption. Signal lights often form part of a complex signaling system, for example a traffic control system with traffic lights. In order to realize said advantages of semiconductor light sources on a large scale, it is necessary for the circuit arrangement to be retrofit with respect to the existing signaling systems.

In existing signaling systems, a signal light is often powered by means of a solid-state relay. A general property of solid-state relays is that a minimum current is required to bring the relay into the conducting state by means of a trigger current and to keep it in that state by means of a holding current. In existing installations, use is customarily made of an incandescent lamp having a load of 135 W. A semiconductor light source used as a signal light, however, customarily has a rated power in the range from 7 W to 20 W and a corresponding, lower current.

This constitutes a problem for the application of the circuit arrangement and the semiconductor light source provided with said circuit arrangement.

BRIEF SUMMARY OF THE INVENTION

It is an object of the invention to provide a measure for completely or partly obviating said problem.

In accordance with the invention, this object is achieved in that the circuit arrangement of the type mentioned in the opening paragraph is characterized in accordance with the invention in that the part between the input terminals and the rectifier means is free of capacitive means. It has been found that this measure precludes in a surprisingly simple manner that, instead of being rendered conducting, the solid-state relay starts oscillating, which means that the solid-state relay switches with a high frequency between the conducting and the non-conducting state. Preferably, the input filter means are positioned between the rectifier means and the converter. This has the advantage that the construction of the circuit arrangement remains relatively simple, while it is precluded that the solid-state relay and the input filter means can jointly form an oscillating circuit. Surprisingly it has also been found that positioning the rectifier means between the input terminals and the input filter means results in more effective filtering by said filter means. This enables, on the one hand, a further reduction in interference to be achieved when unchanged use is made of the known input filter means, and, on the other hand, the use of simpler input filter means when an unchanged level of interference suppression is accepted.

In an advantageous embodiment of the circuit arrangement in accordance with the invention, the input filter means comprise a differential-mode filter. A very suitable differential-mode filter is a π filter.

In this description and in the claims, the term converter is to be taken to mean an electric circuit by means of which an electric power supplied by the power supply is converted to a required current and voltage combination for operating the semiconductor light source. For this purpose, use is preferably made of a switch mode power supply provided with one or more semiconductor switches.

Preferably, a signal light provided with a housing accommodating a semiconductor light source in accordance with the invention is also provided with the circuit arrangement in accordance with the invention. In this manner, the possibilities of using the signal light as a retrofit for an existing signal light are substantially increased. If the circuit arrangement is provided with a housing which is integrated with the housing of the signal light, an optimum range of applications as a retrofit signal light is created.

These and other aspects of the invention will be apparent from and elucidated with reference to the embodiments described hereinafter.

DETAILED DESCRIPTION OF THE INVENTION

Figure 1:
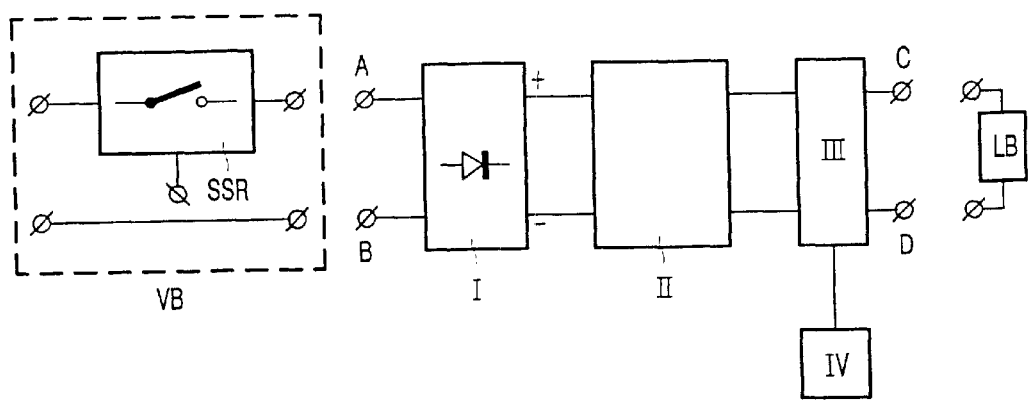
FIG. 1 diagrammatically shows a circuit arrangement in accordance with the invention.

In FIG. 1, connection terminals A, B for connecting a power supply VB are provided with a solid-state relay SSR. Rectifier means are indicated by I, input filter means by II and a converter with a control circuit IV is indicated by III. C, D are output terminals for connecting the semiconductor light source LB. The rectifier means have a positive pole + and a negative pole −. The converter III is of the type described in WO 99/07188. Preferably, the converter is provided with means for removing a leakage current occurring in the SSR in the non-conducting state, for example as described in WO 99/07187.

Figure 2:
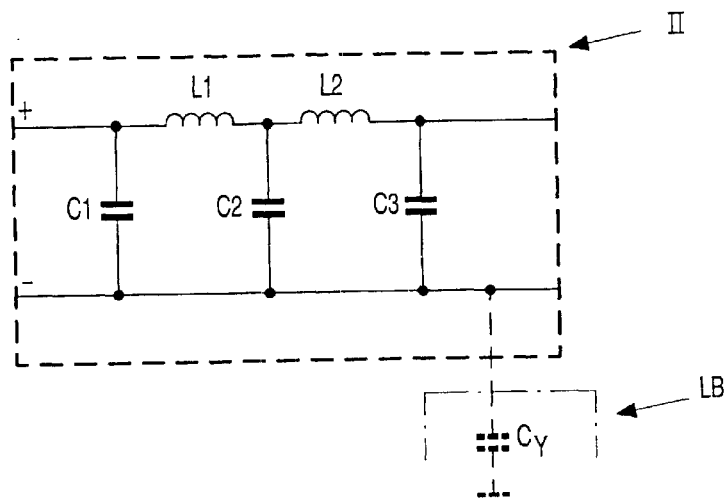
FIG. 2 shows input filter means in greater detail.

In FIG. 2, the input filter means II are shown in greater detail. These input filter means consist of a double π filter which is composed of self-inductions L1, L2 and capacitors. C1, C2, C3. The double π filter shown is predominantly used to suppress differential mode interference. Optionally, to further suppress common mode interference, a common mode capacitor Cy may be provided which is preferably connected to a housing of the semiconductor light source to be connected.

When the power supply VB is switched on, i.e. when the converter III is switched on, capacitive means forming part of the input filter means II will extract a charging current from the power supply before the converter draws a current which is large enough to serve as a triggering and holding current of the SSR present in the power supply. This charging current initially serves as a triggering and holding current for the SSR. As soon as the voltage across the capacitive means has increased sufficiently, the converter will become operative and draw an associated operating current which will henceforth serve as a holding current. It has been found that there is a possibility that switching on the power supply VB causes the input filter means to resonate. The presence of the rectifier means between the connection terminals A, B and the capacitive means of the input filter means II precludes that, in such a situation, a reversal of the current through the SSR occurs, causing said SSR to become non-conducting, while the SSR is switched on again as the current increases, so that the SSR and the input filter means start oscillating, whereby the frequency with which the solid-state relay switches between the conducting and the non-conducting state is high.

In a practical embodiment of the above-described example of the circuit arrangement in accordance with the invention, this circuit arrangement can suitably be connected to a power supply having a rated voltage in the conducting state of 100 V, 60 Hz with a minimum of 80 V and a maximum of 135 V, and the circuit arrangement can also suitably be used to operate a semiconductor light source comprising a matrix of 3*6 LEDs (manufactured by Hewlett-Packard) with a forward voltage $V_F$, defined at 250 mA and an ambient temperature of 25° C., between 2 V and 3 V. The semiconductor light source thus formed imposes a load of approximately 12 V and 625 mA for the circuit arrangement described herein. When the converter is activated, there is a rectified voltage with an effective value of at least 80 V and at most 135 V on the positive pole + of the input filter means. The power supply is provided with a SSR made by Mitsubishi.

With respect to the input filter means II, the size of the self-inductions L1, L2 is 470 μH, the size of the capacitors C1, C2 is 100 nF and the size of the capacitor C3 is 470 nF.

The circuit arrangement, provided with a housing, forms part of a signal light provided with a housing accommodating a semiconductor light source, the housing of the circuit arrangement being integrated with the housing of the signal light. The example described herein can very suitably be used as a traffic light in a traffic control system.

What is claimed is:

1. A circuit arrangement for operating a semiconductor light source, comprising input terminals for connecting to a power supply to receive power from said power supply, input filter means comprising at least one inductive component and at least one capacitive component, rectifier means, a converter with a control circuit, and output terminals from said converter for connecting to the semiconductor light source, said input filter means and said rectifier means being connected in series between said input terminals and said converter, wherein the input filter means is positioned between the rectifier means and the converter, characterized in that the part of the circuit arrangement between the input terminals and the rectifier means is free of capacitive means.

2. A circuit arrangement as claimed in claim 1, characterized in that the input filter means is an electromagnetic interference filter connected between the rectifier means and the converter.

3. A circuit arrangement as claimed in claim 1, characterized in that the input filter means comprise a differential-mode filter.

4. A circuit arrangement as claimed in claim 3, characterized in that the differential-mode filter comprises a π filter.

5. A signal light provided with a housing accommodating a semiconductor light source, characterized in that the signal light is provided with the circuit arrangement as claimed in claim 1.

6. A signal light as claimed in claim 5, characterized in that the circuit arrangement is provided with a housing which is integrated with the housing of the signal light.

7. A circuit arrangement as claimed in claim 2, characterized in that the input filter means comprise a differential-mode filter.

8. A circuit arrangement as claimed in claim 7, characterized in that the differential-mode filter comprises a π filter.

9. A signal light provided with a housing accommodating a semiconductor light source, characterized in that the signal light is provided with the circuit arrangement as claimed in claim 2.

10. A signal light as claimed in claim 9, characterized in that the circuit arrangement is provided with a housing which is integrated with the housing of the signal light.

* * * * *